UNITED STATES PATENT OFFICE.

WILLIAM G. LINDSAY, OF NEW YORK, N. Y., ASSIGNOR TO THE CELLULOID COMPANY, OF NEW YORK, N. Y., A CORPORATION OF NEW JERSEY.

SOLVENT FOR ACETYL CELLULOSE.

1,027,615.      Specification of Letters Patent.      Patented May 28, 1912.

No Drawing.      Application filed August 10, 1911. Serial No. 643,373.

*To all whom it may concern:*

Be it known that I, WILLIAM G. LINDSAY, a citizen of the United States, residing in the city of New York, county of New York, State of New York, have invented certain new and useful Improvements in Solvents for Acetyl Cellulose, of which the following is a specification.

The various compositions to which the present invention relates are employed in the arts, sometimes as imitations of natural substances and sometimes as films which are used for photographic purposes, whether as the base for the sensitized film which is superimposed, or as a component part of the film with which the sensitized substance has been partially incorporated in the sensitization.

Although the final or useful form of the different compounds of acetyl cellulose is that of a solid or dried material, the different processes of conversion into this final solid form involve, as is well understood, the employment of solutions or mixtures of varying consistencies as to placticity, stiffness or fluidity, dependent generally upon the proportion and kind of solvent used to the amount of the original base-acetyl cellulose.

In the treatment of acetyl cellulose for the production of solutions for the manufacture of lacquers, varnishes, photographic films and flexible or plastic compounds, I have discovered that ethyleneacetochlorhydrin $CH_2ClCH_2OOCCH_3$ is a valuable solvent for the acetone-soluble variety of acetyl cellulose. It has a boiling point of about 145° C.; is substantially insoluble in water; is stable, and the resulting products, such as films, varnishes, coatings, sheets, solid objects, etc., are substantially free from odor.

It will be understood by those skilled in the art that acetone, for instance, is a solvent by itself of some varieties of acetyl cellulose, and it will likewise be understood that alcohol and ether are non-solvents, while again, epichlorhydrin is a solvent. This will instruct the operator that my new solvent may be used in conjunction with substances such as I have indicated which, either as solvents in themselves for acetyl cellulose or as non-solvents in themselves, are used to restrain the volatility or modify the solvent action of the other ingredients to adapt the the compound for the individual purposes for which it is to be used, and what varying degrees of temperature, pressure and atmospheric exposure should be used to accomplish the object.

As one example of a method of carrying out my invention practically I proceed as follows:—I take one part of acetyl cellulose, which is soluble in acetone, and introduce it into ten parts (by weight) of ethyleneacetochlorhydrin. The acetyl cellulose dissolves slowly and the solution is formed by stirring and suitable mixing. The solution thus prepared may be used alone or in conjunction with other solvents or non-solvent liquids or solids, such as methyl or ethyl alcohol, acetone, ethylacetate, camphor and its substitutes, etc.

What I claim and desire to secure by Letters Patent is:

1. A new composition of matter consisting of a solution of acetyl cellulose in ethyleneacetochlorhydrin.

2. A new composition of matter consisting of a solution of acetyl cellulose in ethyleneacetochlorhydrin in admixture with other substances either in liquid or solid form.

3. A new composition of matter consisting of a solution of acetyl cellulose in ethyleneacetochlorhydrin in admixture with other solvents and with the accompaniment of inert matters to form solid or liquid compounds.

WILLIAM G. LINDSAY.

Witnesses:
J. HINDON HYDE,
MABEL DENTON.